Feb. 2, 1965     L. EYNON     3,168,332
TRAILER HITCH
Filed Nov. 28, 1962     3 Sheets-Sheet 1
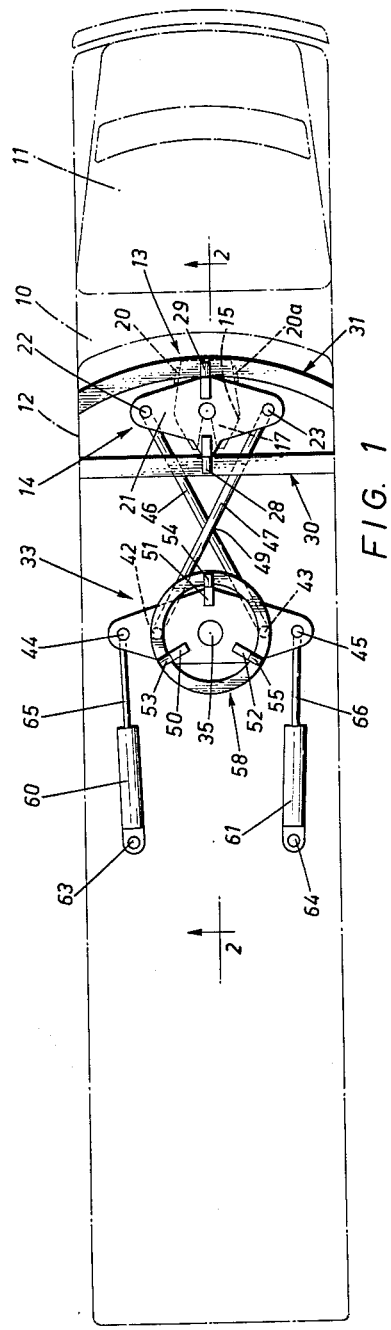
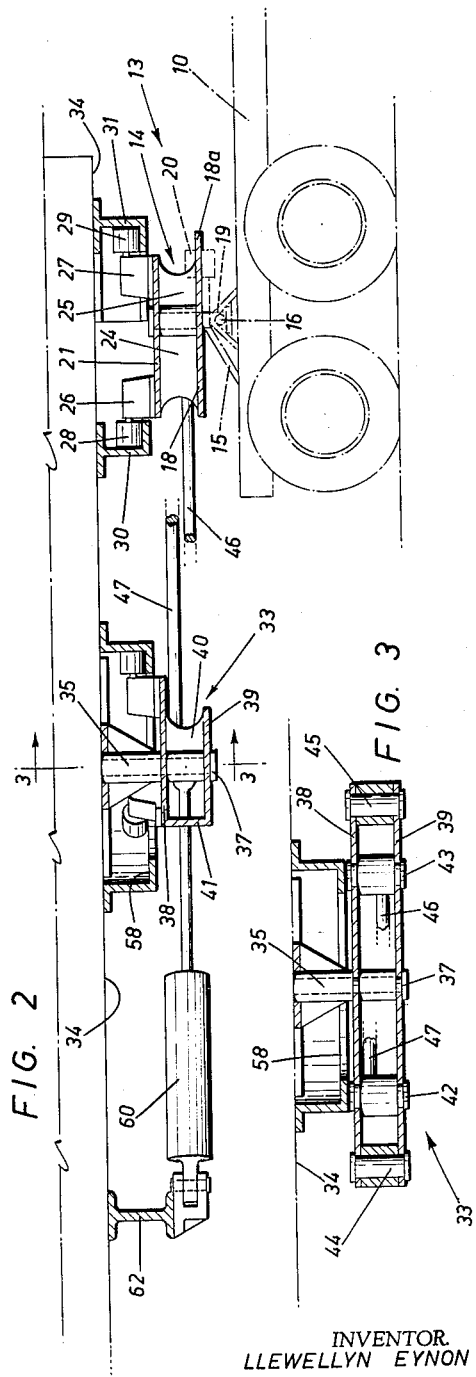
INVENTOR.
LLEWELLYN EYNON
BY
Attorney Feb. 2, 1965  L. EYNON  3,168,332
TRAILER HITCH
Filed Nov. 28, 1962  3 Sheets-Sheet 2
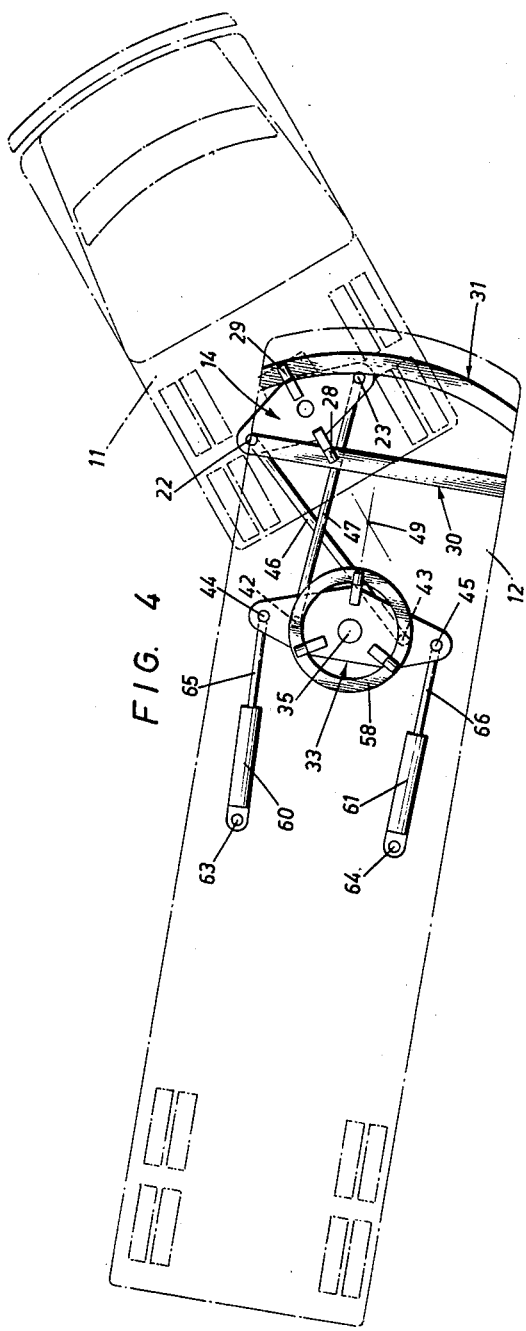
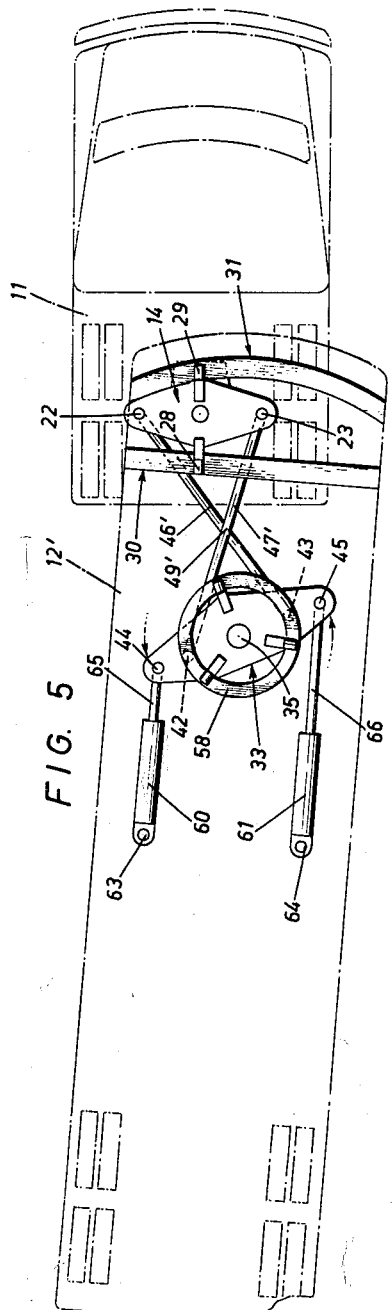
INVENTOR.
LLEWELLYN EYNON
BY
Attorney Feb. 2, 1965 L. EYNON 3,168,332
TRAILER HITCH
Filed Nov. 28, 1962 3 Sheets-Sheet 3

INVENTOR.
LLEWELLYN EYNON
BY
C. Harold Riches
Attorney

United States Patent Office 3,168,332
Patented Feb. 2, 1965

3,168,332
TRAILER HITCH
Llewellyn Eynon, 27 Scarborough Beach Blvd.,
Toronto 13, Ontario, Canada
Filed Nov. 28, 1962, Ser. No. 240,611
6 Claims. (Cl. 280—423)

This invention relates to a trailer hitch. It is particularly directed to an improved tractor trailer hitch by means of which the driver of the tractor can steer the trailer in a rearward direction independently of the cab.

The use of trailer hitches is well known and established in the trucking industry in providing safe and reliable means of towing heavy single and tandem trailers. Standard trailer hitches comprise coupling means, such as a ball and socket joint or pivotally connected bearing plates or the like mechanical means which provides a pivot joint which is stationary relative to the tractor and trailer. However, there are a number of important disadvantages in the use of standard hitches. For example, in maneuvering large trailers backward, the direction of travel of the trailer must be determined by positioning the forward end of the trailer and in heavy traffic or narrow lanes, it is often extremely difficult and time consuming, if not impossible, to laterally displace the forward end of the trailer to direct the rear end of the trailer in the desired direction. A further disadvantage usually present in the use of standard trailer hitches is that the direction of travel of the trailer, while the trailer is backed, is extremely sensitive to slight changes in the direction of the tractor, necessitating a high degree of control by the driver. Also, the turning radius of the trailer and tractor unit is limited by the proximity of the hitch pivot point to the rear end of the cab which is mounted on the tractor, thus requiring sweeping turns.

I have found that by the means of my invention the disadvantages inherent in the use of conventional trailer hitches can be substantially overcome while all the advantages of such hitches are retained. An important feature of this invention resides in the means by which the effective pivot joint securing the trailer at the rear end of the tractor can be laterally displaced completely independent of the tractor movement or position.

It is, therefore, a principal object of my invention to provide an improved trailer hitch which facilitates the backing of trailers.

It is another important object of the present invention to provide a trailer hitch which permits the steering of trailers substantially independently of the tractor position.

A still further object of the present invention is the provision of a trailer hitch which reduces the turning radius of the tractor and trailer unit.

An understanding of the manner in which the above and other objects of this invention are attained can be obtained from the following detailed description, reference being made to the accompanying drawing, in which:

FIGURE 1 is a plan view, partially schematic, of a preferred embodiment of the present invention;

FIGURE 2 is a vertical sectional view taken through line 2—2 of FIGURE 1;

FIGURE 3 is a vertical sectional view taken through line 3—3 of FIGURE 2;

FIGURE 4 is a schematic plan view of the preferred embodiment of the present invention, illustrating the operation of the hitch while the tractor trailer unit is in a turning position;

FIGURE 5 is a schematic plan view of the embodiment of my invention shown in FIGURE 4 in which the operation of the hitch is illustrated while the trailer is steered in a rearward direction;

Like reference characters refer to like parts throughout the body of the specification and drawings.

Figure 6:
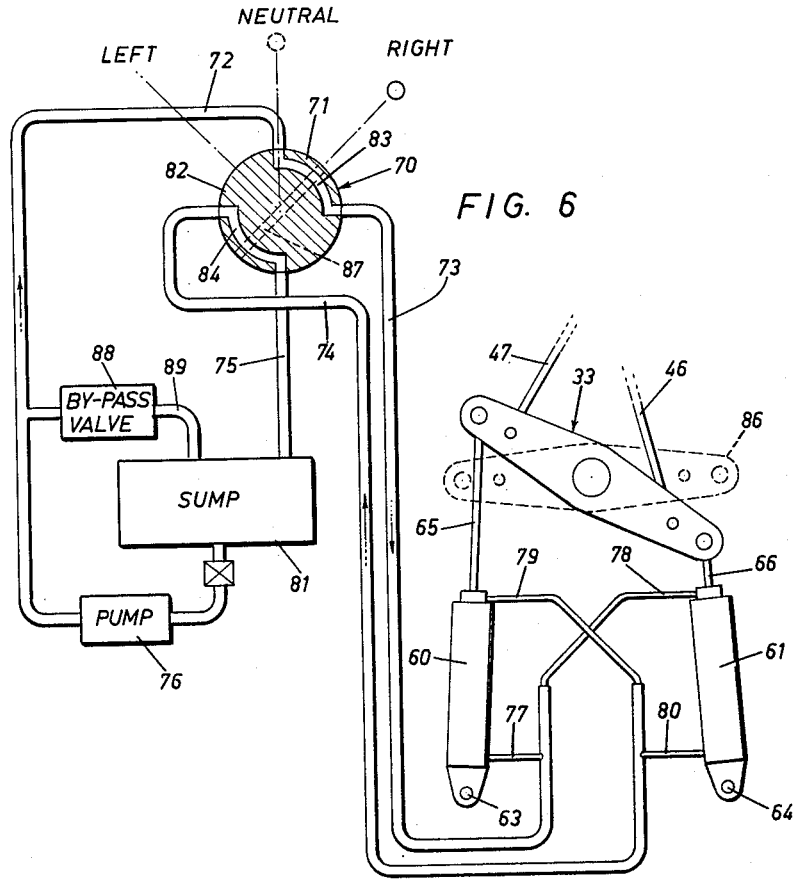
FIGURE 6 is a schematic view of the fluid control system.

Referring to the embodiment of the invention illustrated in FIGURES 1 and 2 of the drawings, the forward end of the trailer 12 is pivotally secured to the bed 10 at the rearward end of the tractor by means of a hitch indicated generally by numeral 13. Hitch 13, carried by the undersurface 11 of the forward end of the trailer 12, comprises a forward yoke 14 removably but rigidly secured to a base plate 15 carried by the bed 10 of the tractor. Base plate 15 is a standard bearing plate provided with a hinged joint 16 and a cut-away portion 17 adapted to receive the trailer bearing plate 18, being the bottom plate of yoke 14, and a flanged connecting spindle 19. The cut-away portion 17 of base plate 15 is provided with conventional jaws, not shown, to prevent longitudinal separation of upper bearing plate 18 from the base plate 15. Vertical plates 20 and 20a, rigidly secured to base plate 15, are adapted to grip the sides of extended portion 18a of bearing plate 18 such that it, plate 18, cannot pivot on base plate 15. This arrangement of parts permits quick assembly and disassembly of the trailer hitch 13 from tractor 11 and allows the use of the present invention with conventional tractors.

Yoke 14 comprises two opposed plates, plate 18 and plate 21, substantially of a yoke-shaped configuration, as shown most clearly by FIGURE 1, rigidly secured together in a predetermined fixed spaced relationship by connecting pivot pins 22 and 23 and central webs 24 and 25. The upper surface of plate 21 rigidly supports bushing housings 26 and 27 which rotatably carry rollers 28 and 29 by means of horizontal shafts. The rollers are thus adapted to roll in races 30 and 31 which are rigidly secured to the underside of trailer bed 34 as shown. The vertical movement and disposition of the forward end of the trailer relative to the tractor are controlled by this roller and race assembly while permitting lateral movement of the trailer relative to the tractor.

A second yoke 33 is pivotally suspended below the bed 34 of the trailer by a vertical spindle 35 which extends through the bed and is rigidly anchored thereto. The opposite lower end of spindle 35 extends through the centre of yoke 33 and is pivotally secured thereto by a flange 37. Yoke 33 comprises two opposed, spaced plates 38 and 39 rigidly secured together in a fixed spaced relationship by webs 40 and 41 and pivot pins 42, 43, 44 and 45. Pins 42 and 43 are vertically disposed inwardly of the extremities of yoke 33 a spaced distance apart substantially equal to the spacing of pins 22 and 23. Pins 44 and 45 are preferably disposed at the extremities of yoke 33 as illustrated.

A pair of rigid rods 46 and 47 having pivot-pin receiving eyes formed in each end thereof interconnect yoke 14 with yoke 33. The forward end of rod 46 is pivotally secured to yoke 14 by pin 22 and the rear end is connected in like manner to yoke 33 by pin 43. The forward end of rod 47 is likewise pivotally secured to yoke 14 by pin 23 and the rear end to pin 42 such that the rods cross, one above the other, to form an effective pivot point 49 at the point of crossing, as shown most clearly by FIGURES 1, 4 and 5.

Three bushing housings, 50, 51 and 52, equi-distantly spaced both radially and peripherally about spindle 35, are rigidly mounted on the upper surface of plate 38. Rollers 53, 54 and 55 are rotatably secured to the respective housings by means of shafts, as shown, such that each roller is free to rotate in a vertical plane and describes an arc of substantially the same radius about spindle 35. A circular race 58 is positioned concentric with spindle 35 and is rigidly secured to the underside of bed 34 of the trailer such that rollers 53, 54 and 55 will freely roll thereon and be supported vertically thereby.

In the embodiment of my invention illustrated, cylinders 60 and 61 are pivotally secured to the underside of trailer bed 34 to the rear of yoke 33 by means of a rigid channel beam 62 and pivotal joints 63 and 64. Rigid connecting rods 65 and 66 are each rigidly connected at one end to a fluid, preferably hydraulic or pneumatic, actuated piston slidably mounted in each cylinder and pivotally connected at the opposite end to the extremities of yoke 33 by means of vertical joining pins 44 and 45 as shown.

Each piston and cylinder unit preferably is double acting and actuated by a hydraulic or pneumatic system of the type illustrated in FIGURE 6 and is controlled by a system of valves readily accessible to the cab driver.

For example, a rotary valve 70 which permits selective introduction of fluid under pressure to one end of each cylinder and the contemporaneous exhaust of fluid to a sump from the opposite end of each cylinder is well known in the art of fluid mechanics. Valve 70 located in the cab comprises a casing 71 having ports connected to fluid lines 72, 73, 74 and 75 as illustrated; line 72 communicating valve 70 with fluid pump 76, line 73 communicating valve 70 with one end of each of cylinders 60 and 61 by lines 77 and 78, line 74 connecting valve 70 with opposite ends of cylinders 60 and 61 by lines 79 and 80, and line 75 connecting valve 70 with sump 81. Valve cock 82 has diametrically opposed peripheral grooves 83 and 84 formed therein each adapted to connect adjacent ports in casing 71. FIGURE 6 illustrates valve cock 82 in its "RIGHT" position having groove 83 connecting lines 72 and 73 such that fluid under pressure is pumped to cylinders 60 and 61 by lines 77 and 78 extending rod 65 and retracting rod 66 causing yoke 33 to pivot in a clockwise direction as viewed in FIGURE 6. Fluid in the opposite ends of cylinders 60 and 61 is discharged to sump 81 via lines 79 and 80, line 74 and groove 84 to line 75. It will be evident that the rotation of valve cock 90° to the position marked "LEFT" will reverse the fluid flow by introducing fluid under pressure from valve 70 to cylinders 60 and 61 via lines 74, 79 and 80 and discharging fluid via lines 77, 78 and 73. Yoke 33 will pivot in a counter-clockwise direction as viewed in FIGURE 6 and can be stopped in the position indicated by broken lines 86 or any other desired position by setting valve cock 82 in the position marked "NEUTRAL" whereby fluid flowing through line 72 under pressure from pump 76 travels through passageway 87 to line 75 and sump 81. Fluid lines 73 and 74 are blocked by valve cock 82 such that the pistons in cylinders 60 and 61 are locked in stationary positions. A by-pass valve 88 in line 89 is adapted to open at a predetermined pressure to circulate fluid from pump 76 to sump 81 in the event line 72 should be blocked.

In operation, yoke 14 is rigidly but removably connected to the bed 10 of tractor 11 by means of the bearing plate assembly such that said yoke cannot pivot relative to the tractor cab. For normal forward movement of the trailer and tractor unit, yoke 33 is anchored at right angles to the longitudinal axis of the trailer by closing fluid entry and exit from the two cylinders while they are in the positions illustrated in FIGURE 4. It may be preferred to incorporate a spring-loaded fluid-actuated key with race 58 which is adapted to engage with a key-way, not shown, formed in the periphery of yoke 33, such that if the fluid pressure is lost the yoke automatically locks in its centered position. Such a device would be desirable where the tractor is not provided with a fluid system or where the cylinders are faulty.

In turning, while moving in a forward direction, the two yokes 14 and 33 preferably remain locked in position creating an effective pivot point 49 which is substantially to the rear of the pivot points normally created by conventional trailer hitches which pivot on base plate 15 and which improves tracking of the trailer wheels relative to the tractor wheels.

In backing the trailer, the two yokes can remain anchored in fixed positions as described above to draw or push the trailer in alignment with the rear end of the tractor or the two pistons can be actuated simultaneously in opposite directions to laterally displace the forward end of the trailer relative to the rear end of the tractor. FIGURE 5 illustrates an arrangement of parts in positioning the trailer to make a right turn in a rearward direction. The piston in cylinder 61 is advanced in the manner described hereinabove by introducing a fluid under pressure to one end of the cylinder and exhausting fluid from the opposite end of the cylinder and the piston in cylinder 60 is likewise simultaneously retracted such that yoke 33 rotates in a counterclockwise direction as viewed from above in the plan view. Rods 46 and 47 thus assume a position as designated by numerals 46' and 47'. The forward end of the trailer is moved laterally to the position indicated by numeral 12', shifting the effective pivot point as indicated by numeral 49'. The rear of the trailer thus faces the desired direction independently of the position of the tractor.

If it is desired to back the trailer in the opposite direction, this may be readily accomplished by simply reversing the fluid control valve until the trailer is positioned in the desired direction by the movement of yoke 33. The control valve can be quickly and readily operated by the driver while he is backing the trailer.

Figure 7:
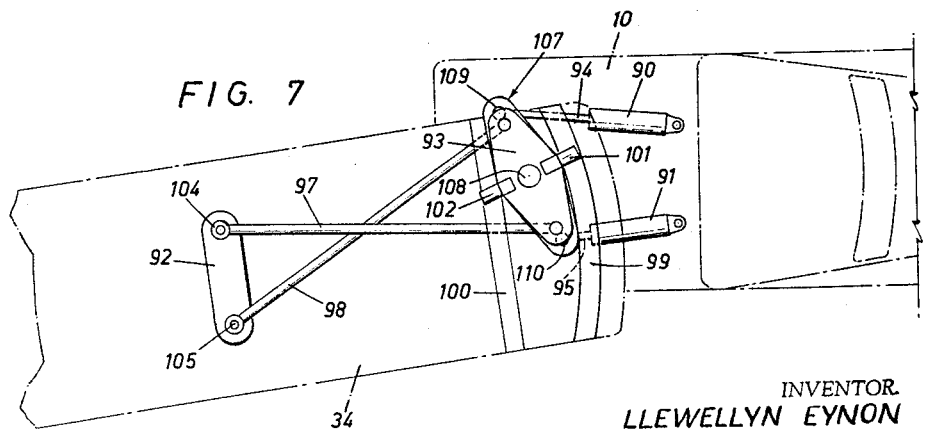
FIGURE 7 is a plan view of an alternative embodiment of the invention.

The preferred embodiment of my invention can be modified as illustrated in FIGURE 7 by pivotally securing the cylinders 90 and 91 to bed 10 of the tractor and pivotally connecting the respective pistons to plate 107 connected to yoke 93 by means of connecting rods 94 and 95. In this latter embodiment, yoke 92 is rigidly secured to bed 34 and yoke 93 suspended by trailer bed 34 as is described hereinbelow, yokes 92 and 93 being interconnected by a pair of crossed rigid rods 97 and 98. A pair of opposed races 99 and 100 secured to the underside of bed 34 and adapted to receive rollers 101 and 102 rotatably mounted on yoke 93 supports yoke 93 and permits transverse movement of the forward end of the trailer relative to said yoke 93. It will be understood that in this latter embodiment the term "yoke" will include a pair of spaced pivot points, such as designated by numerals 104 and 105, in substitution for a member 92.

Yoke 93 has substantially the same structure as yoke 33 described hereinabove and is connected to rods 94 and 95 and pivotally mounted on bed 10 by means of a plate 107 which is removably secured to said yoke by means well known such as bolts or clamps, not shown. Plate 107 is pivotally mounted on bed 10 by a shaft designated by numeral 108 and is secured to rods 94 and 95 at points 109 and 110.

By rotating forward yoke 14 in the manner described hereinabove with reference to the fluid system, the forward end of the trailer is shifted laterally relative to the bed 10 of the tractor to facilitate the backing of the trailer.

The trailer hitch construction which comprises my present invention provides a number of important advantages. Large trailers can be quickly and readily backed into desired positions completely independent of the tractor position. The control valve and system is simple and safe to operate. Backing of trailers is thus facilitated and consequently requires less time, the latter being an important advantage in parking and backing trailers in crowded and congested areas.

It will be understood, of course, that modifications can be made in the preferred embodiment of the invention described herein without departing from the scope of the invention as defined by the appended claims.

What I claim as new and desire to protect by Letters Patent of the United States is:

1. A trailer hitch for connecting a trailer to a pulling vehicle comprising in combination, first and second yoke members normally disposed crosswise of the pulling vehicle and trailer respectively and connectable together in pivotable relation, each of said yoke members having a pair of outer end portions and a central portion, means for securing the first yoke member to the pulling vehicle at the rearward end thereof, means for supporting said yoke member at the forward end of the trailer adapted to permit lateral movement of said yoke relative to the forward end of the trailer, means for securing the second yoke member to the trailer at the central portion thereof, one of said securing means providing a pivotable connection and the other securing means providing a rigid connection, a pair of crossed connecting rods each pivotally secured at one end to the end portion of the first yoke member and pivotally secured at the opposite end to an end portion of the second yoke member, and means secured to the pivotally connected yoke member for rotating said pivotally connected yoke member relative to said rigidly connected yoke member.

2. A trailer hitch for connecting a trailer to a driving vehicle as claimed in claim 1 in which the first yoke member is rigidly but removably secured to the pulling vehicle.

3. A trailer hitch for coupling a trailer to a pulling vehicle as claimed in claim 1 having means for rigidly but removably securing the first yoke member to the pulling vehicle, means for pivotally securing the second yoke member to the trailer, and control means carried by said pulling vehicle for actuating the pivotally mounted yoke member rotating means.

4. A trailer hitch for connecting a trailer to a pulling vehicle comprising, in combination, first and second yoke members normally disposed crosswise of a pulling vehicle and trailer respectively and connectable together in pivotable relation, each of said yoke members having a pair of outer end portions and a central portion; means for securing the first yoke member to the pulling vehicle at the rearward end thereof; a pair of opposed races rigidly secured to the forward end of said trailer, a pair of axially-aligned rollers rotatably secured to said yoke adapted to roll in said races such that said yoke is supported by said races and is free to move laterally relative to the forward end of the trailer; means for securing the second yoke member to the trailer at a central portion thereof; one of said securing means providing a pivotal connection and the other securing means providing a rigid connection; a pair of crossed connecting rods each pivotally secured at one end to an end portion of the first yoke member and pivotally secured at the opposite end to an end portion of the second yoke member; and at least one fluid actuated piston slidably mounted in a cylinder having means for pivotally connecting the cylinder to the trailer and means for pivotally connecting the piston to an outer end portion of the pivotally connected yoke member.

5. A trailer hitch for connecting a trailer to a pulling vehicle comprising in combination, first and second yoke members normally disposed crosswise of the pulling vehicle and trailer respectively and connectable together in pivotable relation, each of said yoke members having a pair of outer end portions and a central portion; means for rigidly but removably securing the first yoke member to the pulling vehicle at the rearward end thereof; means for supporting said first yoke member at the forward end of the trailer consisting of a pair of opposed races rigidly secured to the forward end of said trailer and a pair of axially-aligned rollers rotatably secured to said yoke adapted to roll in said races such that said yoke is supported by said races and is free to move laterally relative to the forward end of the trailer; means for pivotally securing the second yoke member to the trailer at the central portion thereof; a pair of crossed connecting rods each pivotally secured at one end to an end portion of the first yoke member and pivotally secured at the opposite end to an end portion of the second yoke member; and at least one fluid actuated piston slidably mounted in a cylinder having means for pivotally connecting the cylinder to the trailer and means for pivotally connecting the piston to an outer end position of the second yoke member.

6. A trailer hitch for connecting a trailer to a pulling vehicle comprising in combination, first and second yoke members normally disposed crosswise of the pulling vehicle and trailer respectively and connectable together in pivotable relation, each of said yoke members having a pair of outer end portions and a central portion; means for rigidly but removably securing the first yoke member to the pulling vehicle at the rearward end thereof; a pair of opposed races rigidly secured to the forward end of said trailer, a pair of axially-aligned rollers rotatably secured to said yoke adapted to roll in said races such that said yoke is supported by said races and is free to move laterally relative to the forward end of the trailer; means for pivotally securing the second yoke member to the trailer at the central portion thereof, a pair of crossed connecting rods each pivotally secured at one end to an end portion of the first yoke member and pivotally secured at the opposite end to an end portion of the second yoke member, at least one fluid actuated piston slidably mounted in a cylinder, means for pivotally connecting the cylinder to the trailer, and means for pivotally connecting the piston to an outer end position of the second yoke member.

References Cited in the file of this patent

UNITED STATES PATENTS

| | | |
|---|---|---|
| 2,174,493 | Vanderwerf | Sept. 26, 1939 |
| 2,360,902 | Simmons | Oct. 24, 1944 |
| 2,764,424 | Standing | Sept. 25 1956 |
| 2,979,341 | Thomas | Apr. 11, 1961 |